No. 766,392. PATENTED AUG. 2, 1904.
R. C. SAYER.
ELEVATED AND SUBAQUEOUS RAILWAY.
APPLICATION FILED JUNE 27, 1902.
NO MODEL. 4 SHEETS—SHEET 1.

Witnesses.
Samuel Percival
Herbert C. Bolwell

Inventor.
Robert Cooke Sayer
By his Attorneys.
Wheatley & Mackenzie

No. 766,392. PATENTED AUG. 2, 1904.
R. C. SAYER.
ELEVATED AND SUBAQUEOUS RAILWAY.
APPLICATION FILED JUNE 27, 1902.
NO MODEL. 4 SHEETS—SHEET 2.

Witnesses.
Samuel Percival
Herbert C. Bolwell

Inventor
Robert Cooke Sayer
By his Attorneys
Wheatley & MacKenzie

No. 766,392. PATENTED AUG. 2, 1904.
R. C. SAYER.
ELEVATED AND SUBAQUEOUS RAILWAY.
APPLICATION FILED JUNE 27, 1902.
NO MODEL. 4 SHEETS—SHEET 3.
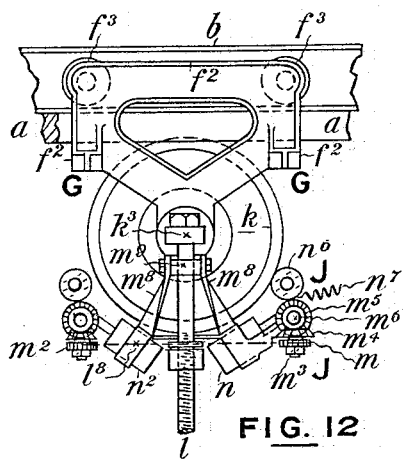
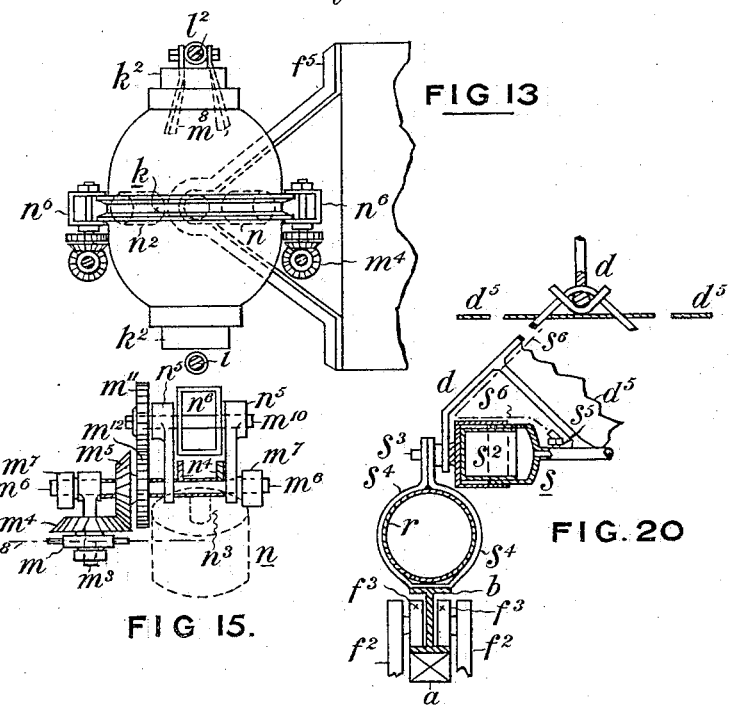
Witnesses.
Samuel Percival
Herbert C. Bolwell
Inventor.
Robert Cooke Sayer
By his Attorneys.
Wheatley & Mackenzie No. 766,392. PATENTED AUG. 2, 1904.
R. C. SAYER.
ELEVATED AND SUBAQUEOUS RAILWAY.
APPLICATION FILED JUNE 27, 1902.
NO MODEL. 4 SHEETS—SHEET 4.

Witnesses.
Samuel Percival
Albert Jones

Inventor
Robert Cooke Sayer
By his Attorneys.
Wheatley & MacKenzie

No. 766,392.

Patented August 2, 1904.

UNITED STATES PATENT OFFICE.

ROBERT COOKE SAYER, OF BRISTOL, ENGLAND.

ELEVATED AND SUBAQUEOUS RAILWAY.

SPECIFICATION forming part of Letters Patent No. 766,392, dated August 2, 1904.

Application filed June 27, 1902. Serial No. 113,538. (No model.)

*To all whom it may concern:*

Be it known that I, ROBERT COOKE SAYER, a subject of the King of Great Britain and Ireland, residing at 11 Clyde road, Redland, Bristol, England, have invented certain new and useful Improvements in Elevated and Subaqueous Railways; and I do hereby declare the following to be a full, clear, and exact description of the invention, such as will enable others skilled in the art to which it appertains to make and use the same.

This invention has for its object a suspended single-rail railway to traverse above land traffic and below water traffic, with passing-places on the level of either traffic, for cars suspended from a rail to load and traverse from or to any passing-place and then occupy a minimum area of either surface and be kept level on the necessarily-steep gradients.

Figure 1:
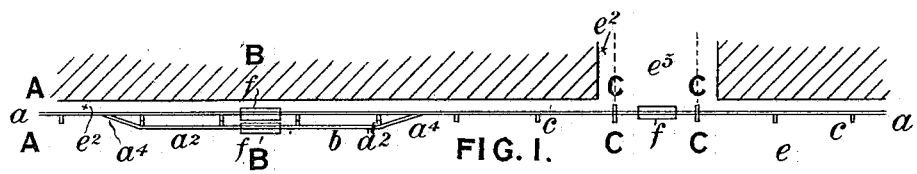
Figure 2:
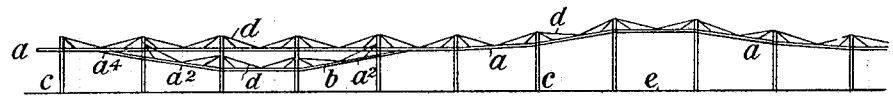
Figure 8:
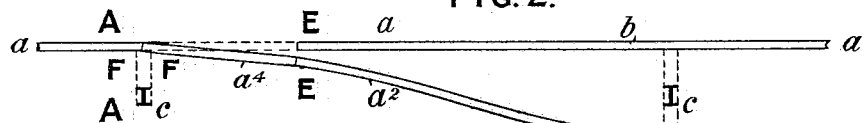
Figures 3, 4:
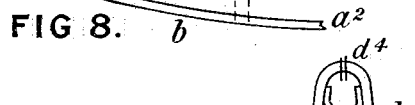
Figure 5:
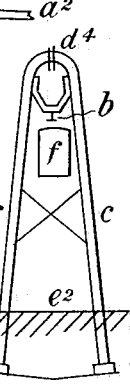
Figures 18, 19:
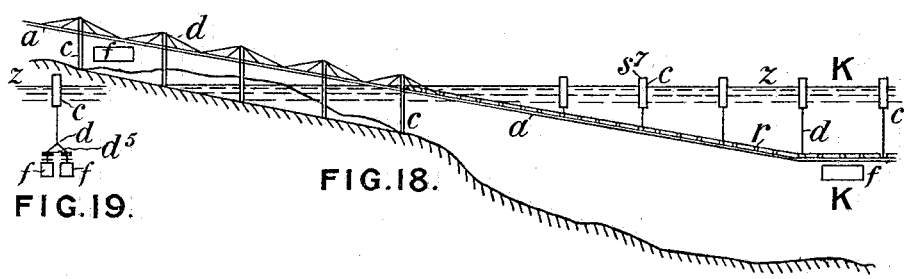
Figures 9, 10, 11, 21:
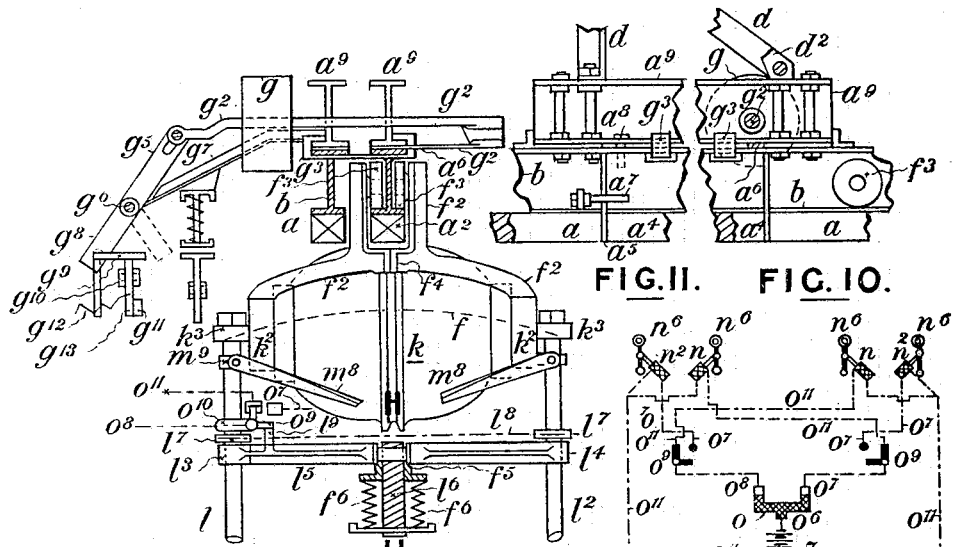
Figure 16:
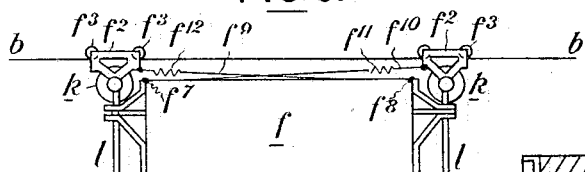
Figure 17:
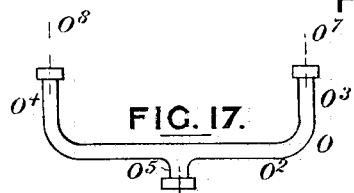
Figure 14:
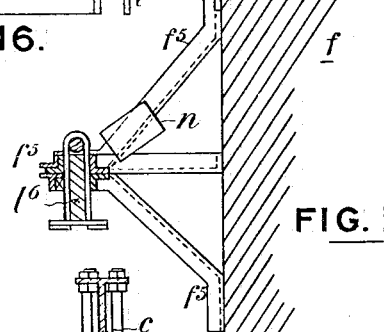
Figure 6:
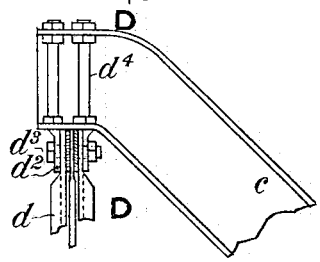
Figure 7:
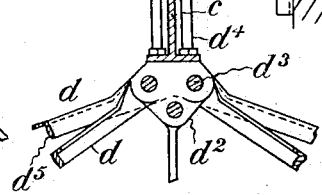

In the three accompanying sheets of explanatory drawings, Figure 1 represents a plan of the railway traversing one street and crossing another, showing a passing or stopping place. Fig. 2 shows an elevation of the same. Fig. 3 is a cross-section at A A on Figs. 1 and 8. Fig. 4 is a cross-section at B B on Fig. 1. Fig. 5 is a cross-section at C C on Fig. 1. Fig. 6 is a detail of part of Fig. 3, showing the method of connecting the supports to the rail. Fig. 7 is a detail cross-section at D D on Fig. 6. Fig. 8 is a detail of a switch for changing rails. Fig. 9 is a detail section at E E on Fig. 8, showing a car with its level-adjusting device and a switch with its operating device. Fig. 10 is a detail elevation of cross-section E E in Fig. 8. Fig. 11 is a detail side elevation of cross-section F F in Fig. 8; Fig. 12, an elevation of part of Fig. 9. Fig. 13 is a plan at G G on Fig. 12. Fig. 14 is a section of a bogie-pin at H H, Fig. 9, and an end of the car. Fig. 15 is a detail elevation at J J, Fig. 12, showing part of the level-adjusting device. Fig. 16 is an elevation of a car. Fig. 17 is an elevation of leveling electric contacts. Fig. 18 is an elevation of the railway where it passes from land to water. Fig. 19 is a cross-section at K K on Fig. 18. Fig. 20 is a detail part of the above. Fig. 21 illustrates diagrammatically the electric circuit in which the leveling-contacts are placed. Figs. 22 to 28 are detail views showing the manner of supplying the motor with power.

The same reference-letters in the different figures indicate the same parts.

The mode of suspending the railway according to this invention is shown by Figs. 1 to 7 and 18 to 20, where $a$ is the rail, $b$ joists to which it is attached, suspended from uprights $c$, formed as floats, Figs. 18 and 19, by struts and ties $d$, connected by ears $d^2$, bolts $d^3$ and $d^4$, and having plates, gussets, or flanges $d^5$ to enable them to take the horizontal as well as vertical effort of the cars when in speed above or below water.

The rails $a$ are suspended over the ground, roadway $e$, or foot-paths $e^2$, so that rapid descent and ascent of the cars by steep gradients $a^2$ may obtain to the street-level passing-places, Fig. 2, and to below the surface of the water, Fig. 18, and be similarly raised to passing-places (not shown) floating at the surface of the water and over cross-streets $e^3$, Fig. 1, or other obstructions. The rails $a$ have switches $a^4$ to divert the cars to $a^2$, Fig. 8, that hinge at $a^5$, Fig. 11, on bolts $a^7$ and $a^8$, secured to a stretcher-joist $a^9$. The switch $a^4$ is opened from $a$ to $a^2$ and back by a motor $g$, that screws in and out the rods $g^2$, that connect it with and actuate $a^4$ at $a^6$ to slide on supports $g^3$, secured to the joists $b$, Figs. 9 and 10. The cars $f$ are carried on two frames $f^2$, each having four wheels $f^3$ to run on the joists $b$, as shown, or on flanges on the rail. The side frames $f^2$ are connected at $f^4$ and carry a motor or driving-wheel $k$ to take against the face or teeth of the rail $a$ to drive the car $f$, Fig. 16. The wheel or motor $k$ may be of any description suitable to act against a smooth or a toothed rail $a$, as provided for by the teeth shown in Fig. 9, by which the wheel or motor $k$ is kept in step with and picks up electric current through valves in the rail. When the current is picked up, it is conveyed to converters, thence to an electric boiler to generate steam. The steam is utilized by a turbine within and rotates the wheel or motor $k$. The wheel or motor $k$ carries the end of the car $f$ by means of the rods $l$ and $l^2$, as hereinafter described, and hauls it by ties $f^9$ and $f^{10}$, hinged to it at $f^7$ and $f^8$ and to the frames $f^2$, so that either end of the car may be lowered. $k$ is suspended by bearings $k^2$, from which screw-bolts $l$ and $l^2$ hinge on swivels $k^3$ and carry sleeve-nuts $l^3$ and $l^4$, connected by an arm $l^5$ to carry by the frames $f^5$, Figs. 13, 14, 16, a bogie-pin $l^6$, and springs $f^6$, on which to support and lower or raise either end of the car $f$ and keep it level on the steep rails $a^2$, for which the bolts $l\ l^2$, Fig. 9, carry pinions $l^7$, a pitch-chain $l^8$ to turn them when actuated by one of two pinions $m$ and $m^2$, Figs. 12 and 15, according to the direction of the car $f$. $m$ rotates on a shaft $m^3$ with a bevel-pinion $m^4$ to engage with its fellow $m^5$, carried on the shaft $m^6$ in bearings $m^7$ on ties $m^8$, Fig. 12, and collars $m^9$ on the bolts $l\ l^2$, Fig. 9. $m^8$ also carries two solenoids $n$ and $n^2$, Figs. 12 and 15, that when electric current is received by them, as below, actuates with its core $n^3$ and links $n^4$, attached to levers $n^5$, the pinion $n^6$ to engage against the action of a spring $n^7$ with the teeth or face of the wheel or motor $k$. The pinion $n^6$ is carried on a shaft $m^{10}$ to rotate with it in bearings on the levers $n^5$, that center on the said shaft $m^6$. $m^{10}$ also carries a pinion $m^{11}$ to engage with its fellow $m^{12}$ on the shaft $m^6$ in any position the solenoid $n$ may send $n^6$. The end of the car to which the current is sent depends on a mercurial tube $o$, Figs. 17 and 21, whose limb $o^2$ is fixed upon and parallel to the longitudinal axis of the car $f$. $o^2$ has limbs $o^3\ o^4\ o^5$ charged with mercury and has electric contacts $o^6\ o^7\ o^8$, that, except $o^6$, are clear of the mercury when $o$ is level; but when one end of the car $f$ and tube $o$ are lowered a contact—say $o^8$—is touched by the mercury and sends current from a source to $o^6\ o^8$, Fig. 9, a switch $o^9$, the same end of the car $f$ that centers on a collar $o^{10}$ on the bolt $l$, and when the sleeves $l^3\ l^4$, arm $l^5$, and that end of the car $f$ are up, as shown, $o^9$ is actuated by an arm $l^9$ upon $l^5$ to send on the current by the wire $o^{11}$ to the solenoid $n$, the other end of the car $f$, to actuate the pinion $n^6$, Fig. 12, to engage with the wheel or motor $k$, and by the mechanism, Fig. 15, to turn the bolts $l\ l^2$ to send that end of the car $f$ down, Fig. 18, until the contact $o^8$, Figs. 17, 21, again clears the mercury and the car $f$ is level.

When the end of the car $f$ and the tube $o$, making contact, are down—say at $o^7$—the switch $o^9$, Fig. 9, being reversed, the current goes to switch $o^9\ o^7$, the solenoid $n^2$, the same end of the car $f$, and raises it by turning the bolts $l\ l^2$ in the reverse direction. That the rails $a$, joists $b$, and parts may be inspected at the surface of the water $z$, Figs. 18 to 20, the rails $a$ are laid with sufficient horizontal or vertical curvature and the struts $d$ carry collapsible pressure-tight chambers $s$, having a cup-leather $s^2$, a pin $s^3$ upon the outer half of $s$ normally passed through a strap $s^4$ to connect floats $r$ to the joists $b$, rails $a$, ties $d$, and upright floats $c$. The chambers $s$ are charged with compressed air through a union $s^5$ and pipe $s^6$, connecting with a stop-valve $s^7$ at the top of the float $c$. When required, the floats $r$ are continuous or connected. Two cars $f$ are suspended, as shown by Fig. 19, or one only. When the motor $g$, Figs. 8 to 11, actuates the switch $a^4$, it works a lever $g^5$ to turn a rocking shaft $g^6$, carried on arms $g^7$, upon the joists $b$. $g^5$ has a lever $g^8$ to indicate, when it is in the position shown dotted and escapes the arm $g^9$, that the switch $a^4$ is set for the car $f$ to traverse the rail $a$; but if the lever $g^8$, as shown, be in the path of the arm $g^9$, which forms part of an electric switch $g^{13}$ on the car $f$, they meet, and $g^{13}$ centers at $g^{10}$ to make contact at $g^{11}$ against the spring $g^{12}$ to cut out the electric current or other pressure actuating the motor or wheel $k$ of the car $f$ and stops it before reaching the switch $a^4$.

Figures 22, 23, 24:
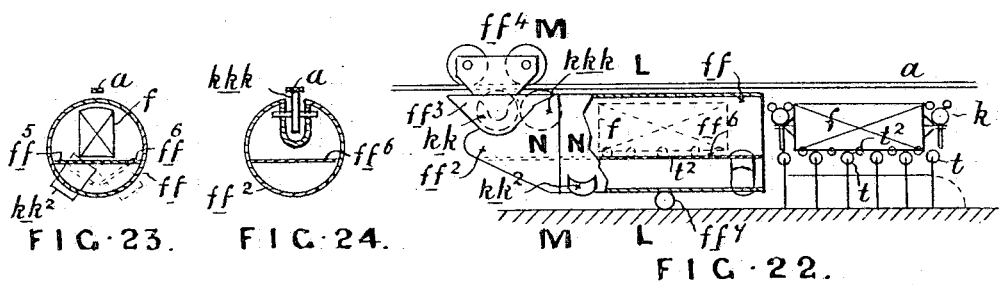
Figure 27:
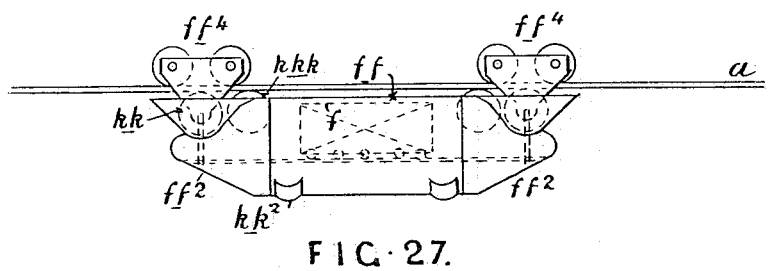
Figure 28:
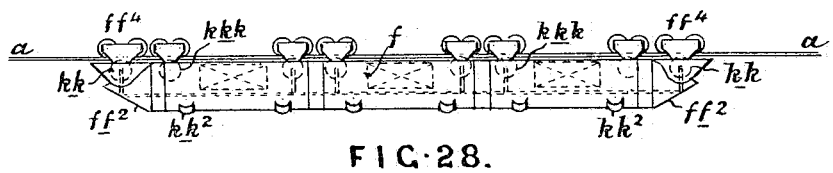

In following a car $f$ from traversing land to traverse subaqueously the car upon its arrival near the water is run upon and carried by rollers $t$, Fig. 22. The frames $f^2$, Fig. 9, are sufficiently separated laterally at their joints $f^4$ to allow them to be lowered by the rods $l$ and $l^2$ for the wheels or motors $k$ to rest on the end frames $f^5$. The car $f$ is then run upon the rollers $t^2$ into a water-transit case or car $f\ f$ to the position shown dotted and there secured. The car $f\ f$ is cylindrical, of which Fig. 23 is a section at L L, Fig. 22, pointed at its ends $f\ f^2$, which are able to be separated from $f\ f$ and connected to it by a spiral rod or tube passed round lugs and chilled to tightly secure them. Fig. 22 shows one end, $f\ f^2$, removed by electrically heating the spiral and stripping it off. $f\ f^2$ is then run into a siding of the rail $a$ by its wheel or motor $k$ ready for the arrival of the car $f$, which when in place in $f\ f$, $f\ f^2$ is run back and secured similarly and a wheel or motor $k$ is started to regulate the air, as follows below.

The ends $f\ f^2$ have prows $f\ f^3$ integral with them to carry the wheels or motors $k$, which are carried on a frame $f\ f^4$ by the rail $a$, from which the whole end is suspended. The wheels or motors $k$ are similar to $k$ of the land-car $f$, but more powerful, and pick up electric current, as above explained, the rail-valves for which are closed by air-pressure greater than that of the water traversed. Compressed air and electric current also (when duplicate supply is desired to prevent possible accident stopping one supply) are picked up similarly by a wheel or motor $k$, Figs. 22 and 24, which is a section at M M, Fig. 22, from a second longitudinal subdivision of the rail $a$, which, as also its fellow, is divided into sections lengthwise and cross-connected, so that a possible leak in any section of either division is confined to that section, the supply being maintained to all the others. The compressed air picked up by the wheel or motor $k$ goes to an air-reservoir in $f\,f^2$, together with any water that may find its way from the joints with the rail-valves or wheel. The water gravitates to the bottom and is discharged from the reservoir and end $f\,f^2$ automatically by an electric circuit causing a valve to open and the compressed air to drive it out. The valve then closes. The air in the reservoir is similarly discharged into the car $f\,f$, $f\,f^2$, and $f$ when the air in them falls to a pressure below 14.7, the supply being regulated by pumps actuated by one of the wheels or motors $k$ of the car $f$, driving the foul air from the car $f\,f$ and its parts. Thus passengers have the car $f$ and allotted parts of the car $f\,f$ for rest, the promenades $f\,f^5\,f\,f^6$ for exercise, pure air at normal pressure, and practically the whole motionless, except forward, the means and motors for obtaining which are duplicated (many times under conditions below explained) at each end $f\,f^2$. The amount of air required is a minimum, due to the production of the motive steam not requiring any.

In addition to the above motors when quick transit is desired at the lowest part of the case $f\,f$, where the external pressure is greatest, other wheels or motors $k\,k^2$ are provided, the blades of which act favorably when placed, as in Fig. 23, (due to water-pressure,) upon the external water to drive the car $f\,f$ forward or backward, for which the steam driving them is obtained and utilized similarly to that for the other wheels or motors $k$. Thus the wheels or motors $k$ constitute the main driving power, the action of which upon the "pick-up-air" wheels or motors $k$ is to drive them forward and by their teeth to rotate them and give the rail $a$ a compressive strain to neutralize the strain by the wheels or motors $k$ and that upon the anchorages, retaining the rail $a$ in position.

The second wheel or motor $k$ of the car $f$ is utilized for the regulation of water-ballast supplied to the car $f\,f$ before starting subaqueously and is put into action automatically, according to the weight of the car $f$, (when within the car $f\,f$, Fig. 22,) acting upon its temporarily-supporting wheels $f\,f^7$, so that if greater than the normal the ballast is pumped or run out. If less, a valve is opened until normal weight is reached. On transit this wheel or motor $k$ is utilized and regulated automatically to maintain water-pressure in the skin of the case $f\,f$, which for lightness is constructed (see Fig. 25, in part a similar section to Fig. 23 on a larger scale) of an inner case $f\,f^9$, a spiral tube $f\,f^{10}$ (given in detail in the application referred to above) outside carrying water-pressure equal to any proportion of that of the exterior water and at or somewhat below its temperature, and an inner tube $f\,f^{11}$, carrying water-pressure with equal temperature to that of the car $f\,f$ or higher than that of $f\,f^{10}$, and an outer skin $f\,f^8$, serrated to pass the lugs $f\,f^{13}$ and give flexibility, shrunk firmly on, so that all are kept compactly together and able to resist the external pressure by fluid-pressure in the skin.

Figures 25, 26:
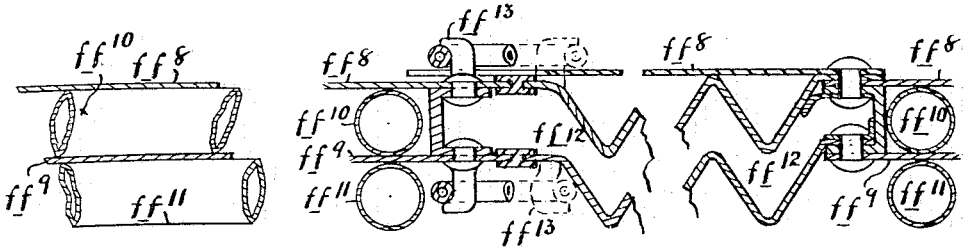

When many cars $f$ meet at the point of subaqueous departure to leave together, the car $f\,f$ is lengthened to the required extent by adding more sections $f\,f$, and the cars $f$ are run in one after the other. $f\,f$ is then closed by the end $f\,f^2$, adjusted as before, and all started, Fig. 28. That the car $f\,f$ may have the necessary flexibility when negotiating gradients and more or less leveled by the rods $l\,l^2$, Fig. 9, at the connections and ends $f\,f^2$, it is corrugated, as shown in Fig. 26 (a section at N N, Fig. 22) and Fig. 28 in elevation, the intermediate space $f\,f^{12}$ having air or water pressure and enables continuation of the promenades $f\,f^5$ and $f\,f^6$, multiplication of the motors, electricity, and air-supply, and increases safety, speed, and comfort.

The working is as follows: The car $f$ being in its normal position, Fig. 16, suspended on the springs $f^6$, Fig. 9, of the bogie-pins $l^6$, Fig. 14, carried by the bolts $l\,l^2$, wheels or motors $k$, frames $f^2$, wheels $f^3$, joists $b$, it is drawn and thrust along by the wheels or motors $k$, the ties $f^9\,f^{10}$, and springs $f^{11}$ and $f^{12}$ above or below water upon the rail $a$. The angle of the struts and ties $d$ and flanges $d^5$, acting against the water, counteract the effort of traction. The car $f$ is free to traverse curves by turning on the springs $f^6$ of the pins $l^6$ and gradients while in a level position by mercury in the tube $o$, Fig. 17, when out of level, making contact at $o^8$ or $o^7$ to send currents to the solenoids $n$ or $n^2$, Fig. 12, to bring the pinion $n^6$ into gear with the wheel $k$ to rotate the bolts $l\,l^2$ by the chain $l^8$, Figs. 9 and 15, and raise or lower an end of the car $f$. The switch $a^4$ for diverting a car $f$ from the rail $a$ to a passing-place $a^2$ or station being inaccessible, the driver of the car or station-master actuates it by known means by actuating the motor $g$, Fig. 9, the fact being made known to the driver by the lever $g^8$ being sent to the position shown to actuate his electric switch $g^{13}$, and thereby stopping his car $f$ before reaching $a^4$. The floats $r$, Figs. 18 and 20, are proportioned to raise the joists $b$ and rails $a$; but the weight of their attachments $d$, $d^5$, and $s$ sink them until the floats $c$ suspend them. The cars $f$ are made buoyant to slightly raise the rails as they pass and in case of possible derailment to float to the surface $z$ and adjustable to raise them, their rails $a$, and parts to the surface of the water $z$, and as the cars $f$ pass on the rails $a$ sink to their normal position. The air-pressure in the chambers $s$ thrust out the pins $s^3$ to keep connection with the rails $a$ and by exhausting the pressure at the valves $s^7$ cause the pressure of the water on the chambers $s$ to collapse them telescopically to withdraw the pins $s^3$ and enable $s\,d\,d^5$ to be floated away and necessitate the rails $a$ and the cars $f$ as they pass to be raised to or near the surface $z$ of the water for inspection. They are resunk by reattaching the said parts.

What I claim, and desire to secure by Letters Patent, is—

1. A means for lowering the rail to the surface of the ground or raising it to the surface of the water by withdrawing the horizontal bolts, substantially as described.

2. In a suspended single-rail railway traversing above land and traffic and below water traffic, with passing-places on the level of either traffic, for cars suspended from a rail to load and traverse from or to any passing-place and then occupy a minimum area of either surface and be kept level on the necessarily-steep gradients, frames with wheels running on the rail, motor-wheels on the frames driving on the under side of the rail, a bogie-spring carried centrally from the frames by elevator-bolts on double swivels at the axis of the driving-wheel cross-bars and raising and lowering mechanism on the elevator-bolts consisting of pinions to gear with the driving-wheel and to turn the elevator-bolts to raise or lower either end of a car of any construction, carried by its frames at each end on the said bogie-springs, mercurial controlling-level of known construction to complete an electric circuit and bring said pinions into gear to actuate the said raising mechanism to keep the car level and links and springs connecting the motor-wheel frames to the most distant ends of the car, substantially as described.

3. In a suspended single-rail railway traversing above land traffic and below water traffic with passing-places on the level of either traffic, for cars suspended from a rail to load and traverse from or to any passing-place and then occupy a minimum area of either surface and be kept level on the necessarily-steep gradients suspended sliding rail-switches to divert the car from the rail to other suspended rails having steep gradients leading to passing-places, the said passing-places for a car at the normal level of and to load with the traffic the car and railway are arranged to avoid while other cars on the adjacent main rail pass them, and other suspended switches and steep gradients for the car to return to the main rail and to other similar stopping-places, and a known means for the driver of the car to know the position of the said switches, consisting of a lever actuated by the rail-switch and an electric switch on the car which does or does not strike against the said lever actuated by the rail-switch, substantially as described.

In testimony whereof I have affixed my signature in presence of two witnesses.

ROBERT COOKE SAYER.

Witnesses:
LIONEL A. WILSON,
GILBERT J. RICKETTS.